United States Patent [19]

Tang

[11] Patent Number: 4,895,768
[45] Date of Patent: Jan. 23, 1990

[54] NON-YELLOWING CLEAR COATINGS

[75] Inventor: Chaucer C. Tang, Bloomfield Hills, Mich.

[73] Assignee: E. I. Du Pont de Nemours and Company, Wilmington, Del.

[21] Appl. No.: 352,504

[22] Filed: May 16, 1989

Related U.S. Application Data

[62] Division of Ser. No. 286,786, Dec. 20, 1988, which is a division of Ser. No. 137,095, Dec. 23, 1987, abandoned.

[51] Int. Cl.$^4$ .............................................. C08L 37/00
[52] U.S. Cl. .................................... 428/461; 524/517; 526/212; 525/194; 525/384
[58] Field of Search ......................... 524/517; 526/212; 525/194, 384; 428/461

[56] References Cited

U.S. PATENT DOCUMENTS

| | | | |
|---|---|---|---|
| 3,029,276 | 4/1962 | Hausweiler et al. | 560/67 |
| 3,206,431 | 9/1965 | Doyle et al. | 560/67 X |
| 3,321,509 | 5/1967 | Burris et al. | 560/67 |
| 3,714,227 | 1/1973 | Ueno et al. | 560/67 |
| 3,809,678 | 5/1974 | Kriesten et al. | 560/67 X |
| 4,101,459 | 7/1978 | Andrews | 260/18 |
| 4,525,521 | 6/1985 | Den Hartog et al. | 524/17 |

FOREIGN PATENT DOCUMENTS 2102009  1/1983  United Kingdom .

OTHER PUBLICATIONS

Neidig et al., "The Esters of Para-Hydroxybenzoic Acid as Preservatives," Reprint from the Drug and Cosmetic Industry—Apr. 1944, pp. 1-8.

*Primary Examiner*—Joseph L. Schofer
*Assistant Examiner*—Jeffrey T. Smith
*Attorney, Agent, or Firm*—Hilmar L. Fricke

[57] ABSTRACT

An automotive and refinish coating containing a curing catalyst which minimizes yellowing of a finish after exposure to weathering wherein the composition has a binder of an acrylic polymer of polymerized monomers of alkyl methacrylate, alkyl acrylate or mixtures thereof and the polymer has pendent aminoester or hydroxy aminoester groups and a glycidyl acrylic crosslinking polymer of polymerized monomers of glycidyl methacrylate or glycidyl acrylate and an alkyl methacrylate or acrylate or mixtures thereof; wherein the catalyst is the alkyl ester of para hydroxy benzoic acid having 1-4 carbon atoms in the alkyl group.

8 Claims, No Drawings

NON-YELLOWING CLEAR COATINGS

CROSS REFERENCE TO RELATED APPLICATIONS

This is a division of application Ser. No. 286,786, filed Dec. 20, 1988, which in turn is a divisional application of Ser. No. 137,095, filed Dec. 23, 1987, now abandoned.

BACKGROUND OF THE INVENTION

This invention is directed to a clear coating composition that uses a catalyst that minimizes yellowing after application and exposure to weathering.

Many modern automobiles have a color base coat finish, i.e. a finish containing pigments and a clear finish over the base coat. Coating compositions have been developed for the repair of these finishes that have properties similar to or the same as the original factory applied finish. One such repair finish or refinish composition is shown in Den Hartog, et al., U.S. Pat. No. 4,525,521 issued June 25, 1985. While the compositions of this patent have excellent physical properties that make them useful as high quality refinish composition, there is a problem of yellowing of the finish upon weathering when conventional catalysts are used such as phenols, resorcinols, boron trifluoride amine complexes, certain benzoates such as resorcinol monobenzoate and the like. Catalysts are required to be used in these compositions to decrease drying time and increase the rate of cure. With the color coat, yellowing is only a minor problem since the color pigments mask any yellowing but with the clear coat yellowing is a problem since it readily is visible.

There is a need for a catalyst that does not cause yellowing upon weathering and provides for an adequate "pot life". By "pot life" is meant the time the composition remains at useable application viscosity.

SUMMARY OF THE INVENTION

A coating composition of an acrylic polymer of polymerized monomers of alkyl methacrylate, alkyl acrylate or mixtures thereof and the polymer has pendent aminoester or hydroxy aminoester groups and a glycidyl acrylic crosslinking polymer of polymerized monomers of glycidyl methacrylate or glycidyl acrylate and an alkyl methacrylate or acrylate or mixtures thereof; containing a curing catalyst of the alkyl ester of para hydroxy benzoic acid having 1-4 carbon atoms in the alkyl group.

DETAILED DESCRIPTION OF THE INVENTION

The catalyst used in the coating composition of this invention minimizes yellowing after application and exposure to weathering of a clear coating composition of an acrylic polymer having amino ester or hydroxy aminoester groups and a glycidyl acrylic crosslinking polymers and provides the composition with an adequate pot life.

The catalyst is the alkyl ester of para hydroxy benzoic acid that has 1-4 carbon atoms in the alkyl group. Typically useful catalysts are as follows: methyl para hydroxy benzoate, ethyl para hydroxy benzoate, propyl para hydroxy benzoate, isopropyl para hydroxy benzoate, butyl para hydroxy benzoate, isobutyl para hydroxy benzoate and the like; methyl-3-5-dimethyl-4-hydroxy benzoate, ethyl-3-5-dimethyl-4-hydroxy benzoate, methyl-3-methyl-4-hydroxy benzoate and corresponding homologs thereof.

The catalyst is used in the coating composition in amount of about 0.5-10% by weight, based on the weight of the binder. Preferably, the catalyst is used in an amount of about 2-6% by weight, based on the weight of the binder.

Typical coating compositions of this invention contain about 20-80% by weight of binder and 80-20% by weight of solvent for the binder. The binder is a blend of about 60-80% by weight of an acrylic polymer and 20-40% by weight of a glycidyl acrylic crosslinking polymer.

Coating compositions to which catalyst is added are shown in the aforementioned Den Hartog, et al., U.S. Pat. No. 4,525,521 which is hereby incorporated by reference.

The acrylic polymer used in the coating composition is composed of polymerized monomers of methyl methacrylate, alkyl methacrylate, alkyl acrylate or mixtures thereof each having 2-12 carbon atoms in the alkyl group and has pendent amino ester groups or hydroxy amino ester groups. The polymer has a number average molecular weight of about 3,000-15,000 and a weight average molecular weight of about 6,000-40,000.

Molecular weight is determined by gel permeation chromatography using polymethyl methacrylate as the standard.

One preferred acrylic polymer contains about 35-55% by weight methyl methacrylate, 35-50% by weight lauryl methacrylate or butyl methacrylate and 10-15% by weight methacrylic acid which polymer has been post reacted with an alkylene imine such as propylene imine to provide amino ester groups pendent from the carbon-carbon polymer backbone of the formula

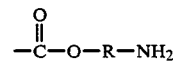

where R is an alkylene group having 2-3 carbon atoms.

Another preferred acrylic polymer contains about 10-50% by weight styrene, an alkyl methacrylate or an alkyl acrylate or mixtures thereof where the alkyl groups contain from 1-12 carbon atoms and methacrylic acid or acrylic acid which is post laminated with an alkylene imine to form aminoester groups pending from the backbone having the above formula. One particularly preferred acrylic polymer contains about 20-50% styrene, 30-70% by weight of an alkyl methacrylate such a butyl methacrylate and 10-15% by weight of methacrylic acid or acrylic acid post reacted with an alkylene imine such as propylene imine to provide amino ester groups having the above formula.

Another preferred acrylic polymer contains about 40-50% by weight methyl methacrylate, 25-45% by weight of an alkyl acrylate or methacrylate such as butyl methacrylate or lauryl methacrylate and 5-20% by weight glycidyl methacrylate or glycidyl acrylate that has been reacted with ammonia to form hydroxy amino ester groups pendent from the carbon-carbon polymer backbone of the formula

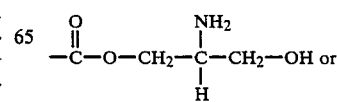

-continued

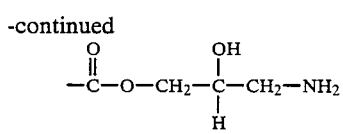

Still another preferred polymer contains about 10-50% by weight styrene, an alkyl methacrylate or an alkyl acrylate each having 1-12 carbon atoms in the alkyl group and glycidyl methacrylate or glycidyl acrylate that has been reacted with ammonia to form hydroxy amino ester groups pendent from the carbon-carbon polymer backbone having the above formulas. One particularly preferred acrylic polymer contains about 20-50% by weight of styrene 30-70% by weight of an alkyl methacrylate such as butyl methacrylate and 5-20% by weight of glycidyl methacrylate or glycidyl acrylate that has been reacted with ammonia to provide the aforementioned hydroxy aminoester groups.

The glycidyl acrylic crosslinking polymer is composed of polymerized monomers of glycidyl methacrylate or glycidyl acrylate and an alkyl methacrylate, alkyl acrylate or mixtures thereof each having 2-12 carbon atoms in the alkyl groups and has a number average molecular weight of about 5,000-20,000 and a weight average molecular weight of about 6,000-40,000. Preferably, the polymer contains about 60-85% by weight of glycidyl methacrylate and 15-40% by weight of an alkyl methacrylate such as lauryl methacrylate or butyl methacrylate. Other useful polymers contain about 40% by weight butyl methacrylate/60% glycidyl methacrylate and 20% butyl methacrylate/80% glycidyl methacrylate.

Typical alkyl methacrylate and alkyl acrylate monomers that are used to prepare the aforementioned polymers are ethyl methacrylate, propyl methacrylate, butyl methacrylate, isobutyl methacrylate, pentyl methacrylate, hexyl methacrylate, ethyl hexyl methacrylate, nonyl methacrylate, decyl methacrylate, lauryl methacrylate, ethyl acrylate, propyl acrylate, butyl acrylate, isobutyl acrylate, pentyl acrylate, hexyl acrylate, ethyl hexyl acrylate, nonyl acrylate, decyl acrylate, lauryl acrylate and the like.

The composition can contain pigments. These pigments can be introduced into the composition by first forming a mill base with the acrylic polymer utilized in the composition or with other compatible polymers or polymer dispersants by conventional techniques, such as sand-grinding, ball milling, attritor grinding, two roll milling to disperse the pigments. The mill base is blended with the film-forming constituents.

Any of the conventional pigments used in coating compositions can be utilized in the composition such as the following: metallic oxides, such as titanium dioxide, zinc oxide, iron oxide and the like, metal hydroxide, metal flakes such as aluminum flake, chromates, such as lead chromate, sulfides, sulfates, carbonates, carbon black, silica, talc, china clay, phthalocyanine blues and greens, organo reds, organo maroons and other organic pigments and dyes.

To improve weather ability of finishes of the coating composition about 0.1-5%, by weight, based on the weight of the binder, of an ultraviolet light stabilizer or a combination of ultraviolet light stabilizers can be added. Typically useful ultra-violet light stabilizers are as follows:

Benzophenones such as hydroxy dodecyloxy benzophenone, 2,4-dihydroxybenzophenone, hydroxybenzophenones containing sulfonic groups and the like.

Triazoles such as 2-phenyl-4-(2',2'-dihydryoxylbenzoyl)-triazoles, substituted benzotriazoles such as hydroxy-phenyltriazoles and the like.

Triazines such as 3,5-dialkyl-4-hydroxyphenyl derivatives of triazine, sulfur containing derivatives of dialyl-4-hydroxy phenyl triazines, hydroxy phenyl-1,3,5-triazine and the like.

Benzoates such as dibenzoate of diphenylol propane, tertiary butyl benzoate of diphenylol propane, and the like.

Other ultraviolet light stabilizers that can be used include lower alkyl thiomethylene containing phenols, substituted benzenes such as 1,3-bis-(2'-hydroxybenzoyl)benzene, metal derivatives of 3,5-di-t-butyl-4-hydroxy phenyl propionic acid, asymmetrical oxalic acid, diarylamides, alkylhydroxy-phenyl-thioalkanoic acid ester and the like.

Particularly useful ultraviolet light stabilizers that can be used are hindered amines of bipiperidyl derivatives such as those in Murayama, et al., U.S. Pat. No. 4,061,616, issued Dec. 6, 1977.

The catalyst containing coating composition of this invention can be applied by any of the conventional application methods, such as spraying, electrostatic spraying, dipping, brushing, flow-coating and the like. The viscosity of the composition can be adjusted for any of these methods by adding solvents if necessary. Generally, the composition is utilized at a high solids content which keeps air pollution at a minimum level.

The coatings are usually dried at ambient temperatures and are tack free after about 1-4 hours and fully cured after about 4-7 days. The coatings can be baked at relatively low temperatures of about 65°-140° C. for about 15 minutes-2 hours. The resulting coating is about 0.1-5 mils thick but for most uses, a 1-3 mil thick coating is used. One technique that is used to insure that there will be no popping or cratering of the coating is to allow the solvents to flash off for about 15-30 seconds before a second coating is sprayed on or otherwise applied, then waiting from about 2-10 minutes before baking the coating to allow any residual solvents to flash off if the coating is to be baked. The resulting coating has good gloss and can be rubbed or polished with conventional techniques to improve the smoothness, appearance and gloss. The coating has good adhesion to substrates of all types, is hard and resistant to weathering, solvents, alkali, scratches and the like.

When used as a fully cured color coat and clear coat finish, generally, the color coat is about 0.4-1.5 mils thick and preferably 0.6-1.0 mils thick and the clear coat is about 0.5-6.0 mils thick and preferably 0.8-2.0 mils thick.

In the following examples all parts and percentages are on a weight basis unless otherwise indicated. Molecular weights are determined by gel permeation chromatography using polymethyl methacrylate as the standard. The following abbreviations are used: MMA—methyl methacrylate, BMA—butyl methacrylate, S—styrene, GMA—glycidyl methacrylate, MAA—methacrylic acid.

EXAMPLE

A coating composition was prepared by charging the following constituents in a mixing vessel and thoroughly mixing the constituents together:

|  | Parts by Weight |
| --- | --- |
| Acrylic Polymer solution (40% solids of a MMA/BMA/S/MAA in a weight ratio 38/30/20/12 iminated with propylene imine and having Mn ave. 8,900 and Mw ave. 14,500 in solvent blend of isopropanol and toluene) | 13.59 |
| Glycidyl Methacrylate Copolymer solution (56% solids of a GMA/BMA in a weight ratio of 60/40 having Mn ave. 2562 and Mw ave. 5244 in xylene solvent) | 3.00 |
| Xylene | 2.29 |
| methyl para hydroxy benzoate | 0.03 |
| Total | 18.91 |

The above composition was sprayed onto a "Bonderized" steel panel primed with a black dip primer and coated with a white polyurethane enamel. The panel was dried at ambient temperatures and the ΔB value was measured with a spectrophotometer described in U.S. Pat. No. 4,479,718 issued Oct. 30, 1984 to D. Alman. The ΔB value indicates the yellow color vector of a finish. The panel was then exposed for three weeks to sunlight on a rack on a roof and the ΔB value was again measured. The ΔB values are as follows: initial ΔB 0.43, after 3 weeks exposure 2.24, change in ΔB 1.81.

The gel time of the composition was measured at 60° C. with a Sunshine Gel Time Meter and the gel time was 217 minutes.

A composition identical to the above was prepared except methyl-3-5-dimethyl-4-hydroxy benzoate was substituted for the methyl para hydroxy benzoate in the same amount. The gel time was measured as above and was 265 minutes. Panels were sprayed as above and exposed to weathering for 3 weeks as above and the initial and final ΔB values were measured and are as follows: initial ΔB 0.52, after 3 weeks weathering ΔB 1.86, change in ΔB 1.34.

The following 8 compositions were prepared identical to the above composition except a different catalyst but in the same amount was used in place of the methyl para hydroxy benzoate. As a comparison, composition 1 did not contain a catalyst. The gel time for each of the compositions was determined as above and the initial ΔB was measured and the ΔB after 3 weeks weathering was measured for each of the coatings. The results are shown in the following Table:

TABLE

| Catalyst | Gel Time (mins.) | Initial ΔB | 3 Weeks Weathering ΔB | Change ΔB |
| --- | --- | --- | --- | --- |
| None | 562 | 0.30 | 0.47 | 0.17 |
| resorcinol monobenzoate | 251 | 0.51 | 5.39 | 4.88 |
| methyl ortho hydroxy benzoate | 388* | — | — | — |
| methyl meta hydroxy benzoate | 223 | 0.61 | 4.93 | 4.32 |
| 2,4,6 trimethyl phenol | 382 | 0.40 | 3.00 | 2.60 |
| methyl 3,5-dichloro-4-hydroxy benzoate | 289 | 0.63 | 5.41 | 4.78 |
| 2-6-dimethyl phenol | 291 | 0.57 | 2.80 | 2.23 |
| methyl-3-chloro-4-hydroxy benzoate | 134 | 1.78 | 9.80 | 8.02 |

For an acceptable automotive refinish product, the gel time is required to be no more than 265 minutes and change in ΔB values of 1.8–2.0 after 3 weeks weathering. The methyl para hydroxy benzoate and methyl-3-5-dimethyl-4-hydroxy benzoate catalysts met these requirements whereas the other catalysts did not and are not considered acceptable.

I claim:

1. A substrate coated with a layer of a dried and cured composition which before drying and curing comprises about 20–80% by weight of a binder and 0–20% by weight solvent for the binder, wherein the binder consists essentially of about 60–80% weight, based on the weight of the binder, of an acrylic polymer of polymerized monomers of alkyl methacrylate, alkyl acrylate or mixtures thereof and the polymer having pendent aminoester or hydroxy aminoester groups and 20–60% by weight based on the weight of the binder, of a glycidyl acrylic crosslinking polymer of polymerized monomers of glycidyl methacrylate or glycidyl acrylate and an alkyl methacrylate or acrylate or mixtures thereof; wherein the coating composition contains about 0.5–10% be weight, based on the weight of the binder, of catalyst consisting of the alkyl ester of para hydroxy benzoic acid having 1–4 carbon atoms in the alkyl group.

2. The substrate of claim 1 in which the catalyst of the coating composition consists of methyl para hydroxy benzoate.

3. The substrate of claim 1 in which the catalyst of the coating composition consists of methyl-3-5-dimethyl-4-hydroxy benzoate.

4. The substrate of claim 1 in which the coating composition contains about 2–6% by weight, based on the weight binder, of a catalyst consisting of methyl para hydroxy benzoate.

5. The substrate of claim 1 in which the coating composition contains about 2–6% by weight, based on the weight binder, of a catalyst consisting of methyl-3-5-dimethyl-4-hydroxy benzoate.

6. A substrate coated with a dried pigmented paint layer that is top coated with a dried and cured layer of the coating composition of claim 1.

7. The substrate of claim 1 in which the substrate is metal.

8. The substrate of claim 1 in which the substrate is plastic.

* * * * *

UNITED STATES PATENT AND TRADEMARK OFFICE
CERTIFICATE OF CORRECTION

PATENT NO. : 4,895,768

DATED : January 23, 1990

INVENTOR(S) : Chaucer C. Tang

It is certified that error appears in the above—identified patent and that said Letters Patent is hereby corrected as shown below:

In the Claims

Column 6, line 25, "0-20%" should read --80-20%--

Signed and Sealed this

Seventh Day of May, 1991

Attest:

HARRY F. MANBECK, JR.

Attesting Officer

Commissioner of Patents and Trademarks